United States Patent
Zhou et al.

(10) Patent No.: US 11,184,125 B2
(45) Date of Patent: Nov. 23, 2021

(54) NETWORK TRIGGERED REFERENCE SIGNAL COVERAGE EXTENSION IN WIRELESS COMMUNICATION

(71) Applicant: QUALCOMM Incorporated, San Diego, CA (US)

(72) Inventors: Yan Zhou, San Diego, CA (US); Tao Luo, San Diego, CA (US); Makesh Pravin John Wilson, San Diego, CA (US); Xiaoxia Zhang, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 16/258,424

(22) Filed: Jan. 25, 2019

(65) Prior Publication Data
US 2019/0238287 A1 Aug. 1, 2019

Related U.S. Application Data

(60) Provisional application No. 62/624,408, filed on Jan. 31, 2018.

(51) Int. Cl.
*H04L 5/00* (2006.01)
*H04W 52/14* (2009.01)
(Continued)

(52) U.S. Cl.
CPC .......... *H04L 5/0035* (2013.01); *H04B 7/063* (2013.01); *H04B 7/0626* (2013.01);
(Continued)

(58) Field of Classification Search
None
See application file for complete search history.

(56) References Cited

U.S. PATENT DOCUMENTS

2016/0338039 A1* 11/2016 Van Der Velde ..... H04W 76/10
2017/0195033 A1* 7/2017 Zhang ............... H04W 74/0833
(Continued)

FOREIGN PATENT DOCUMENTS

WO 2014029095 A1 2/2014
WO WO-2014029095 A1 * 2/2014 .......... H04W 52/244

OTHER PUBLICATIONS

SONY: "Summary of SRS", 3GPP Draft; R1-171494—Summary of SRS Design-0.2, 3rd Generation Partnership Project (3GPP), Mobile Competence Centre; France, vol. RAN WG1, No. Prague,Czechia Republic; Aug. 21, 2017-Aug. 25, 2017 Aug. 26, 2017 (Aug. 26, 2017) (Year: 2017).*
(Continued)

*Primary Examiner* — Jutai Kao
(74) *Attorney, Agent, or Firm* — Loza & Loza, LLP

(57) ABSTRACT

Aspects of the present disclosure provide various apparatuses and methods for extending a reference signal to facilitate carrier aggregation (CA). In some examples, a network includes a primary cell and one or more secondary cells that use a millimeter wave (mmW) carrier. When a UE is beyond the range of a reference signal from the secondary cell, the primary cell may trigger the secondary cell to increase the range of its reference signal using a higher gain beam and/or reference signal repetition.

27 Claims, 15 Drawing Sheets

(51) Int. Cl.
*H04W 52/24* (2009.01)
*H04B 7/06* (2006.01)
*H04W 52/28* (2009.01)
*H04B 17/336* (2015.01)
*H04B 17/318* (2015.01)
*H04J 11/00* (2006.01)
*H04W 92/20* (2009.01)
*H04W 24/02* (2009.01)

(52) U.S. Cl.
CPC ......... *H04B 17/318* (2015.01); *H04B 17/336* (2015.01); *H04L 5/001* (2013.01); *H04L 5/005* (2013.01); *H04W 52/143* (2013.01); *H04W 52/241* (2013.01); *H04W 52/245* (2013.01); *H04W 52/283* (2013.01); *H04B 7/0617* (2013.01); *H04J 11/0076* (2013.01); *H04J 11/0079* (2013.01); *H04L 5/0023* (2013.01); *H04L 5/0057* (2013.01); *H04W 24/02* (2013.01); *H04W 92/20* (2013.01)

(56) References Cited

U.S. PATENT DOCUMENTS

| | | | | |
|---|---|---|---|---|
| 2018/0310281 | A1* | 10/2018 | Takeda | H04W 4/70 |
| 2018/0351605 | A1* | 12/2018 | Liang | H04B 7/0417 |
| 2018/0359790 | A1* | 12/2018 | Ingale | H04W 28/16 |
| 2019/0069258 | A1* | 2/2019 | Jeon | H04W 16/28 |
| 2020/0220604 | A1* | 7/2020 | Simonsson | H04B 7/0695 |

OTHER PUBLICATIONS

Huawei et al., "Motivation for new SI on Massive Beamforming for SCell Coverage", 3GPP Draft, RP-151888 Motivation for new Work Item Proposal on Massive Beamforming for SCell Coverage, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 7, 2015-Dec. 10, 2015, Dec. 7, 2015 (Dec. 7, 2015), XP051052788, 5 Pages, Retrieved from the Internet: URL:http://www.3gpp.org/ftp/Meetings_3GPP_SYNC/RAN/Docs/ [retrieved on Dec. 7, 2015], slide 3.

International Search Report and Written Opinion—PCT/US2019/015347—ISA/EPO—dated Apr. 12, 2019.

SONY: "Summary of SRS", 3GPP Draft, R1-1714941—Summary of SRS Design-0.2,3rd Generation Partnership Project (3GPP), Mobile Competence Centre, 650, Route Des Lucioles, F-06921 Sophia-Antipolis Cedex, France, vol. RAN WG1, No. Prague, Czechia Republic, Aug. 21, 2017-Aug. 25, 2017, Aug. 26, 2017 (Aug. 26, 2017), XP051328460, 5 Pages, Retrieved from the Internet:URL:http://www.3gpp.org/ftp/tsg_ran/WG1_RL1/TSGR1_90/Docs/ [retrieved on Aug. 26, 2017], Section 2 "Coverage issue", p. 2-p. 3.

* cited by examiner

NETWORK TRIGGERED REFERENCE SIGNAL COVERAGE EXTENSION IN WIRELESS COMMUNICATION

PRIORITY CLAIM

This application claims priority to and the benefit of U.S. provisional patent application No. 62/624,408 filed in the United States Patent Office on Jan. 31, 2018, the entire content of which is incorporated herein by reference as if fully set forth below in its entirety and for all applicable purposes.

TECHNICAL FIELD

The technology discussed below relates generally to wireless communication systems, and more particularly, to reference signal extension in wireless communication. Embodiments can provide and enable techniques for extending a reference signal coverage to facilitate carrier aggregation between a primary cell and a secondary cell.

INTRODUCTION

Reference signals are commonly used in wireless communication to facilitate various communication functions, for example, channel estimation and measurement, signal demodulation, synchronization, beam management and selection, interference estimation, cell search and selection, etc. Hence, reference signals can be generally categorized into two types, including reference signals for the purpose of channel measurement and reference signals for demodulation of data. One example of reference signals is the Channel State Information Reference Signal (CSI-RS) that may be used by a user equipment (UE) to estimate a wireless channel and report channel quality information (CQI) back to a base station. Channel estimation determines the characteristic of a wireless channel so that a receiver can remove the noise and/or distortion introduced by the channel from the received signal. For example, the base station or network can transmit a CSI-RS, and the UE evaluates the received signal quality based on the CSI-RS and reports the measurement results to the network.

Beamforming is a technique for improving the performance (e.g., throughput, signal quality) of wireless communications using multiple antennas. Beamforming applies different weightings of amplitude and phase to the signal on each antenna in order to transmit the signal in one or more beams. In beamforming applications, the base station can generate a beamforming matrix based on a specific channel report from a UE, for example, based on the CSI-RS. The beamforming matrix may include the magnitude and phase information for configuring the antennas.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the present disclosure provides an apparatus for wireless communication using carrier aggregation in a wireless communication network that includes a primary cell (PCell) and a secondary cell (SCell). The apparatus includes a communication interface configured for wireless communication, a memory, and a processor operatively coupled to the communication interface and the memory. The apparatus transmits a first reference signal of the PCell and receives a first measurement report from a user equipment (UE). The first measurement report indicates a quality of the first reference signal. The apparatus determines that the UE is potentially located in a coverage area of the SCell based on the quality of a first reference signal. The apparatus transmits an SCell measurement configuration message for configuring the UE that is potentially located in the coverage area of the SCell to measure a second reference signal transmitted by the SCell for initial beam selection using one or more first beams. The apparatus transmits a signal boost message for triggering the SCell to extend a range of the second reference signal from a first range to a second range, in response to determining that a quality of the second reference signal is less than a predetermined quality.

Another aspect of the present disclosure provides a user equipment (UE) for wireless communication using carrier aggregation in a wireless communication network that includes a PCell and an SCell. The UE includes a communication interface configured for wireless communication, a memory, and a processor operatively coupled to the communication interface and the memory. The UE measures a first reference signal received from the PCell, and the UE transmits a first measurement report of the first reference signal to the PCell. The first measurement report facilitates the PCell in determining that the UE is potentially in a coverage area of the SCell. The UE measures a second reference signal received from the SCell. The UE transmits a second measurement report indicating a quality of the second reference signal to the PCell. The second measurement report facilitates the PCell in triggering the SCell to extend the second reference signal from a first range to a second range. The UE searches for a range-extended second reference signal for initial beam selection for carrier aggregation of the PCell and SCell.

Another aspect of the present disclosure provides a method of carrier aggregation in a wireless communication network that includes a PCell and an SCell. A scheduling entity of the PCell transmits a first reference signal of the PCell and receives a first measurement report from a user equipment (UE). The first measurement report indicates a quality of the first reference signal. The scheduling entity determines that the UE is potentially located in a coverage area of the SCell based on the quality of the first reference signal. The scheduling entity transmits an SCell measurement configuration message for configuring the UE that is potentially located in the coverage area of the SCell to measure a second reference signal transmitted by the SCell for initial beam selection using one or more first beams. The scheduling entity transmits a signal boost message for triggering the SCell to extend a range of the second reference signal from a first range to a second range, in response to determining that a quality of the second reference signal is less than a predetermined quality.

Another aspect of the present disclosure provides a method of carrier aggregation operable at a user equipment (UE). The UE measures a first reference signal from a primary cell (PCell) and transmits a first measurement report of the first reference signal to the PCell. The first measurement report indicates that the UE is potentially in a coverage area of a secondary cell (SCell). The UE measures a second reference signal from the SCell and transmits a second measurement report indicating a quality of the second reference signal to the PCell. The second measurement report facilitates the PCell in triggering the SCell to extend the second reference signal from a first range to a second range. Then the UE searches for a range-extended second reference signal for initial beam selection for carrier aggregation of the PCell and SCell.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
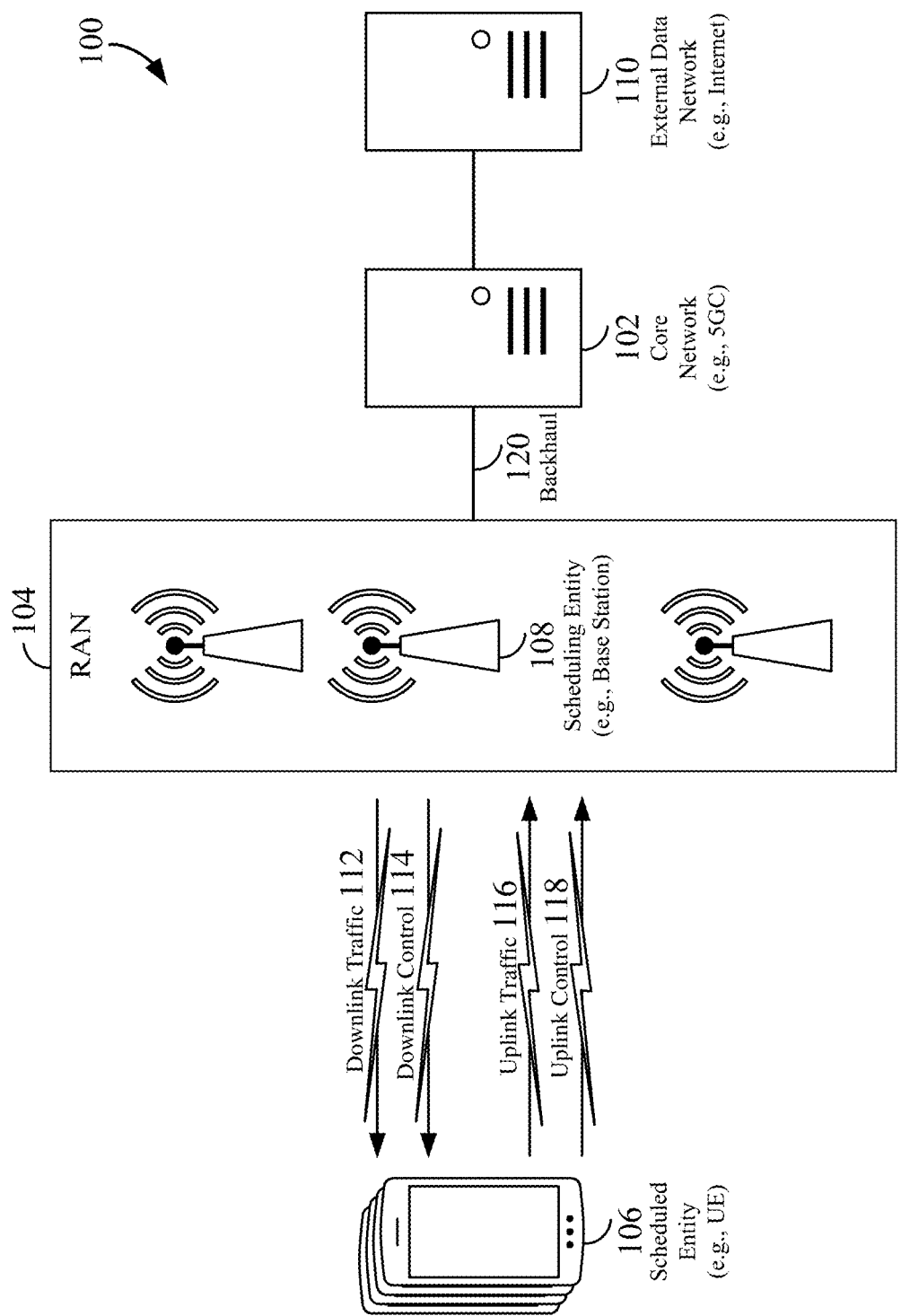
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily include a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure provide various apparatuses and methods for extending the range of a reference signal to facilitate carrier aggregation (CA) in wireless communications. In some examples, a network includes a primary cell (PCell) and one or more secondary cells (SCells). The PCell and SCells may use carriers in different frequency bands. For example, the PCell may use a carrier with a frequency below 6 GHz, and the SCells may use a millimeter wave (mmW) carrier. In some aspects of the disclosure, when a UE is beyond the range of a reference signal from the secondary cell (SCell), the primary cell may trigger the secondary cell to increase the range of its reference signal using a higher gain beam and/or reference signal repetition.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In a hybrid RAN, an LTE cell may act as a primary cell (PCell), and one or more 5G NR cells may be secondary cells associated with the PCell. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. A primary cell may communicate with a secondary cell using a backhaul connection. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
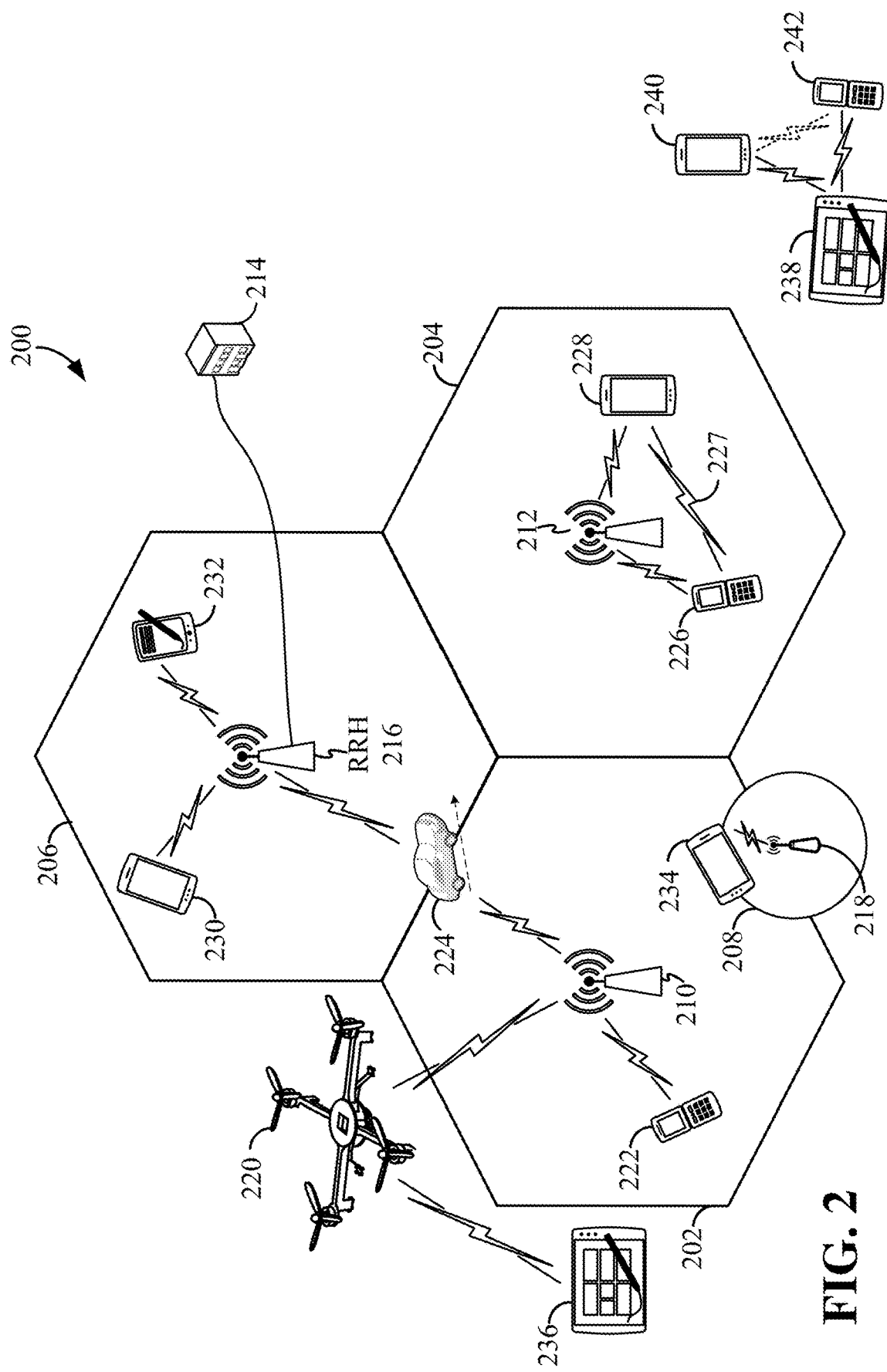
FIG. 2 is a conceptual illustration of an example of a radio access network.

FIG. 2 is a diagram illustrating an example of a radio access network (RAN) 200. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal (e.g., a reference signal) from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). In some examples, the PSS, SSS and PBCH may be included in a synchronization signal block (SSB).

The UEs 222, 224, 226, 228, 230, and 232 may receive the unified synchronization signals or SS blocks, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next-generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
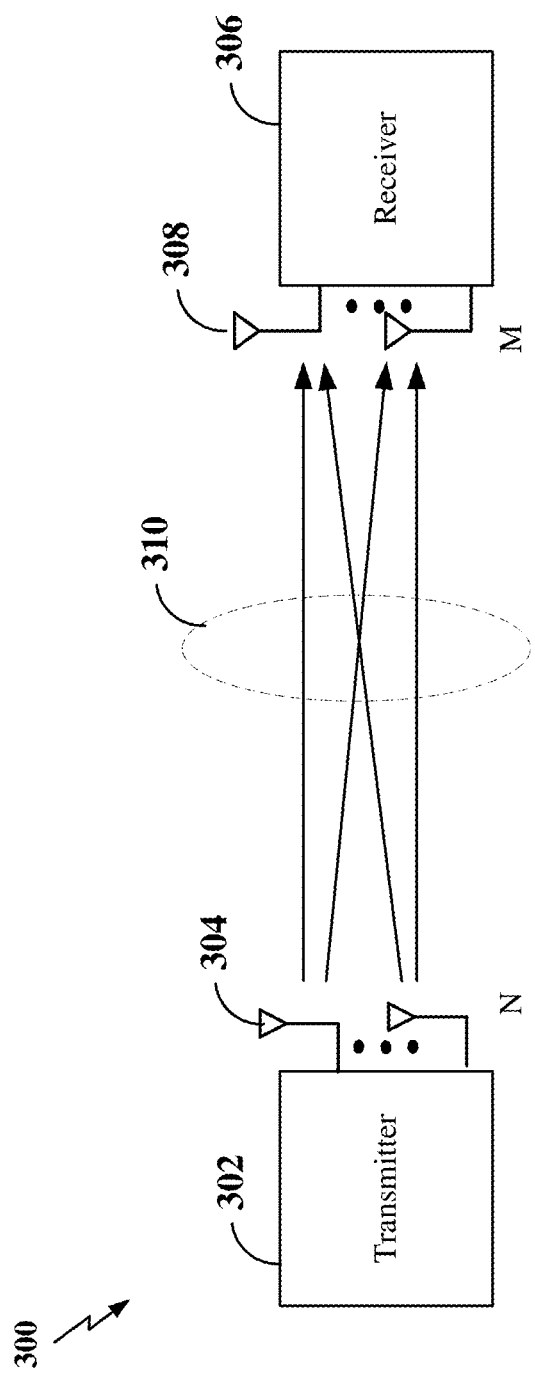
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. For example, the scheduling entity may be a base station, eNB, or gNB. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

In Time Division Duplex (TDD) systems, the UL and DL are reciprocal, in that each uses different time slots of the same frequency bandwidth. Therefore, in TDD systems, the base station may transmit the Channel State Information Reference Signal (CSI-RS) with separate C-RS sequences for each layer to provide for multi-layer channel estimation. From the CSI-RS, the UE may measure the channel quality across layers and resource blocks.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In the developing 5G NR specifications, user data may be coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

Referring back to FIG. 2, the air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In some aspects of the disclosure, 5G networks may support carrier aggregation of a primary cell (PCell) and one or more secondary cells (SCells). In some examples, the PCell may use sub-6 GHz carriers, and the SCells may use above-6 GHz carriers (e.g., mmW carriers). In one example, the PCell may be an LTE cell, and the SCells may be 5G cells. The PCell and SCells may be implemented using the RAN 200.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described hereinbelow. That is, while some examples of the present disclosure may focus on an OFDM link for clarity, it should be understood that the same principles may be applied as well to DFT-s-OFDMA waveforms and other types of OFDMA waveforms.

Within the present disclosure, a frame refers to a predetermined duration (e.g., 10 ms) for wireless transmissions, with each frame consisting of a predetermined number of subframes (e.g., 10 subframes of 1 ms each). On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO and/or beamforming implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more resource blocks (RBs) scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
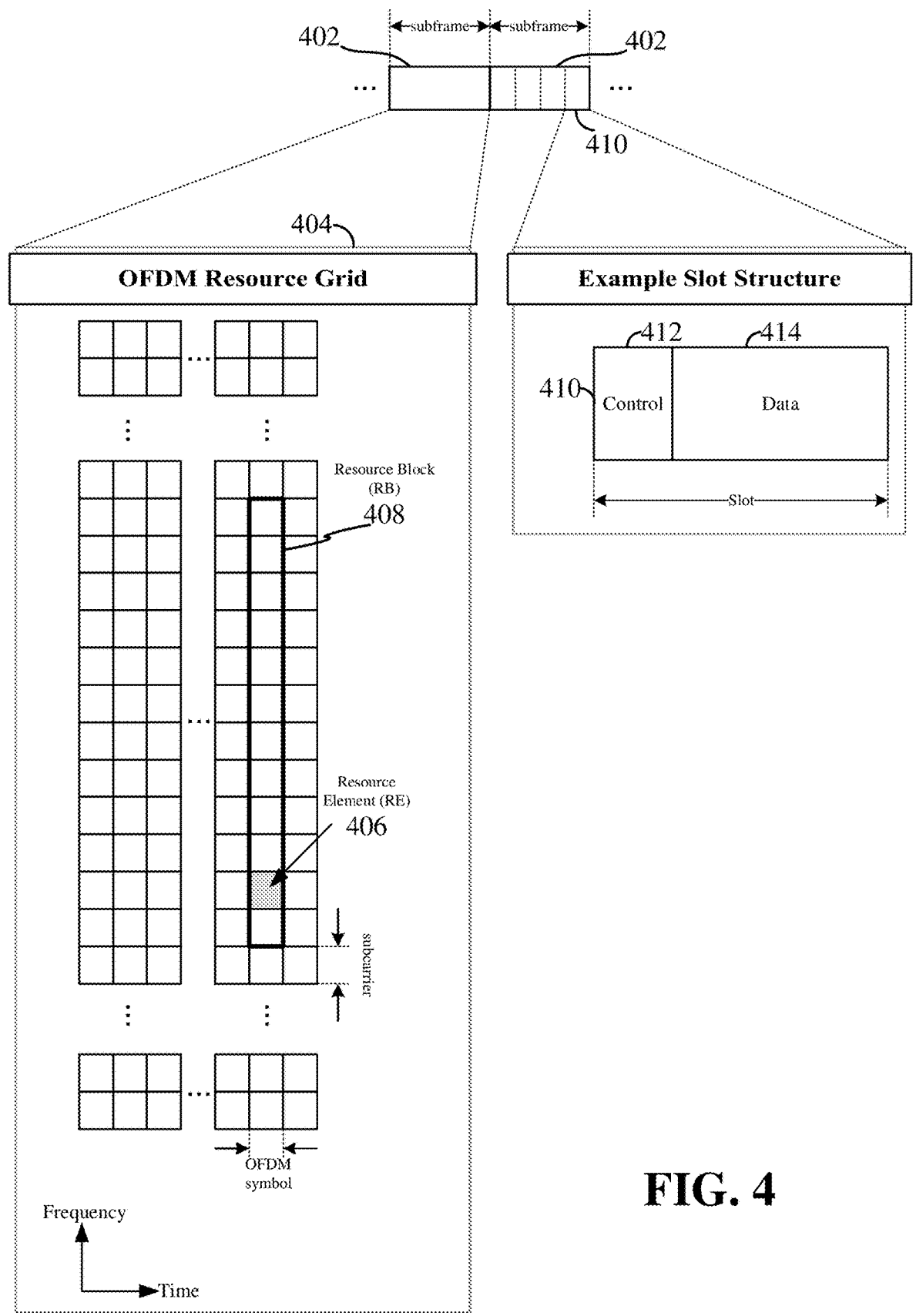
FIG. 4 is a schematic illustration of an organization of wireless resources in an air interface utilizing orthogonal frequency divisional multiplexing (OFDM).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SSB that includes 4 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize nonconsecutive symbols for an SSB, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 406 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for a UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
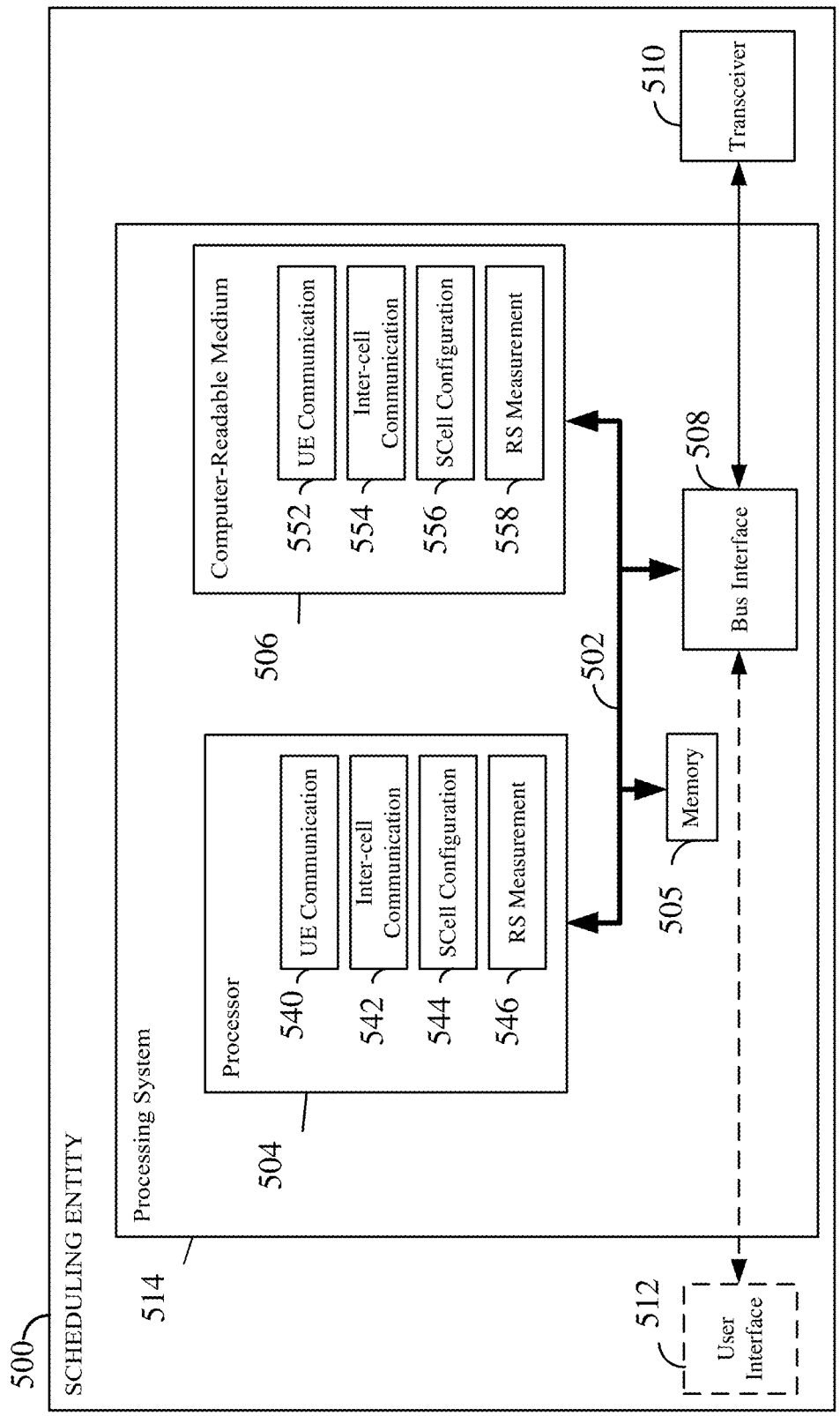
FIG. 5 is a block diagram conceptually illustrating an example of a hardware implementation for a scheduling entity according to some aspects of the disclosure.

FIG. 5 is a block diagram illustrating an example of a hardware implementation for a scheduling entity 500 employing a processing system 514. For example, the scheduling entity 500 may be a user equipment (UE) as illustrated in any one or more of FIGS. 1, 2, 7-9, and/or 11. In another example, the scheduling entity 500 may be a base station as illustrated in any one or more of FIGS. 1, 2, 7-9 and/or 11.

The scheduling entity 500 may be implemented with a processing system 514 that includes one or more processors

504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein. That is, the processor 504, as utilized in a scheduling entity 500, may be used to implement any one or more of the processes and procedures described below and illustrated in FIGS. 8-15.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided. Of course, such a user interface 512 is optional, and may be omitted in some examples, such as a base station.

In some aspects of the disclosure, the processor 504 may include circuitry, for example, UE communication circuit 540, inter-cell communication circuit 542, SCell configuration circuit 544, and reference signal (RS) measurement circuit 546, configured to implement one or more of the functions described below in relation to FIGS. 8-15. The UE communication circuit 540 may be configured to perform various communication-related functions (e.g., UL communication and DL communication) between the scheduling entity 500 and one or more UEs or scheduled entities. The inter-cell communication circuit 542 may be configured to perform various communication-related functions (e.g., backhaul communication) between a PCell and an SCell. The SCell configuration circuit 544 may be configured to perform various SCell configuration functions, for example, reference signal configuration of an SCell. The RS measurement circuit 546 may be configured to control and configure RS measurement configuration of a reference signal of an SCell.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may include software (e.g., UE communication instructions 552, inter-cell communication instructions 554, SCell configuration instructions 556, and RS measurement configuration instructions 558) configured to implement one or more of the functions described above in relation to FIGS. 8-15. The UE communication instructions 552 may configure the processor 504 to perform various communication-related functions (e.g., UL communication and DL communication) between the scheduling entity 500 and one or more scheduled entities (e.g., UEs). The inter-cell communication instructions 554 may configure the processor 504 to perform various communication-related functions (e.g., backhaul communication) between a PCell and an SCell. The SCell configuration instructions 556 may configure the processor 504 to perform various SCell configuration functions, for example, reference signal configuration of an SCell. The RS measurement configuration instructions 558 may configure the processor 504 to control and configure RS measurement configuration of a reference signal of an SCell.

Figure 6:
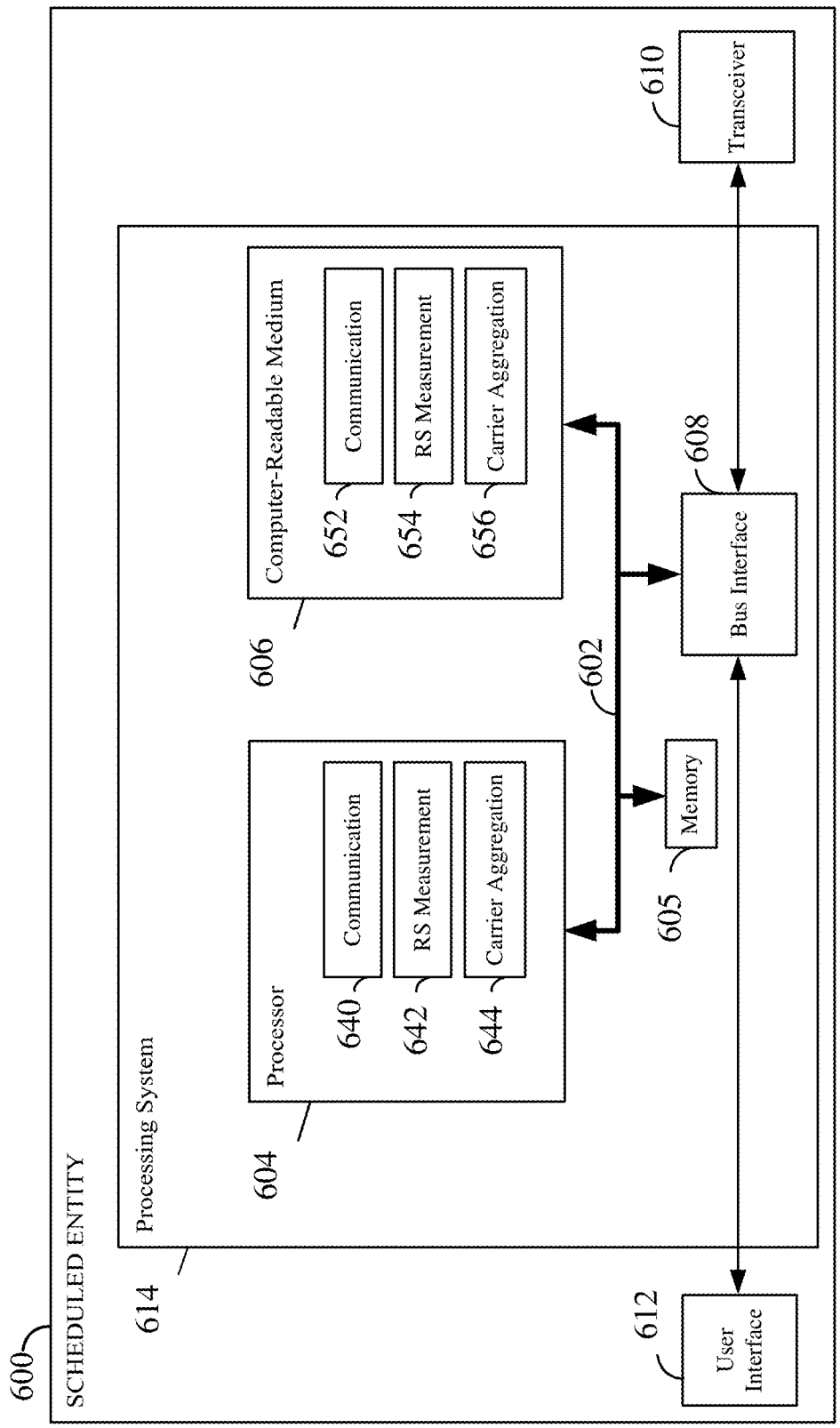
FIG. 6 is a block diagram conceptually illustrating an example of a hardware implementation for a scheduled entity according to some aspects of the disclosure.

FIG. 6 is a conceptual diagram illustrating an example of a hardware implementation for an exemplary scheduled entity 600 employing a processing system 614. In accordance with various aspects of the disclosure, an element, or any portion of an element, or any combination of elements may be implemented with a processing system 614 that includes one or more processors 604. For example, the scheduled entity 600 may be a UE as illustrated in any one or more of FIGS. 1, 2, 7-9 and/or 11.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5. That is, the processor 604, as utilized in a scheduled entity 600, may be used to implement any one or more of the processes described below and illustrated in relation to FIGS. 8-15.

In some aspects of the disclosure, the processor 604 may include circuitry, for example, communication circuit 640, reference signal (RS) measurement circuit 642, and carrier aggregation circuit 644, configured to implement one or more of the functions described below in relation to FIGS. 8-15. The communication circuit 640 may be configured to perform various communication-related functions (e.g., UL communication and DL communication) between the scheduled entity 600 and a scheduling entity (e.g., PCell or SCell). The RS measurement circuit 642 may be configured to perform various reference signal measurement functions, for example, measuring and reporting reference signals of a PCell and an SCell. The carrier aggregation circuit 646 may be configured to perform various carrier aggregation related functions, for example, aggregating carriers from a PCell and an SCell.

In one or more examples, the computer-readable storage medium 606 may include software (e.g., communication instructions 652, RS measurement instructions 654, and carrier aggregation instructions 656) configured to implement one or more of the functions described above in relation to FIGS. 8-15. The communication instructions 652 may configure the processor 604 to perform various communication-related functions (e.g., UL communication and DL communication) between the scheduled entity 600 and a scheduling entity (e.g., PCell or SCell). The RS measurement instructions 654 may configure the processor 604 to perform various reference signal measurement functions, for example, measuring and reporting reference signals of a PCell and an SCell. The carrier aggregation instructions 656 may configure the processor 604 to perform various carrier aggregation related functions, for example, aggregating carriers from a PCell and an SCell.

Figure 7:
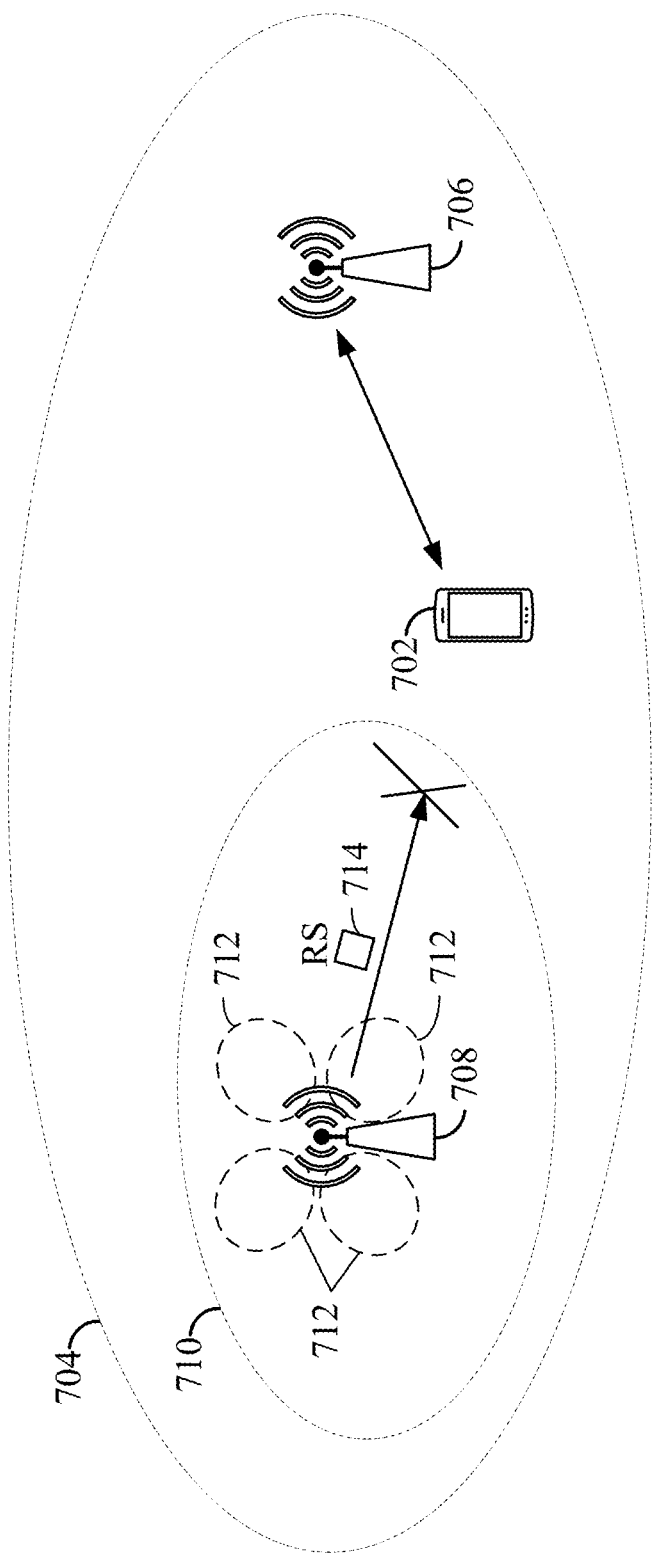
FIG. 7 is a diagram illustrating a carrier aggregation (CA) scenario according to some aspects of the present disclosure.

FIG. 7 is a diagram illustrating a carrier aggregation (CA) scenario in accordance with some aspects of the present disclosure. A UE 702 may be located in a primary cell (PCell) 704 controlled by a first base station 706. The first base station 706 may be associated with a second base station 708 that controls a secondary cell (SCell) 710. The UE 702 may be any of the UEs illustrated in FIGS. 1, 2, and/or 3. The first base station 706 and second base station 708 may be any of the base stations or scheduling entities illustrated in FIGS. 1, 3, and/or 3. In some examples, the PCell 704 and SCell 710 form a 5G hybrid RAN. The first base station 706 may communicate with the UE 702 using one or more sub-6 GHz carriers, and the second base station 708 may communicate with the UE 702 using one or more carriers above 6 GHz (e.g., millimeter wave (mmW) carriers). When using above-6 GHz frequency (e.g., mmW) carriers, the second base station 708 may use beamforming to transmit and receive signals. In some examples, the first base station 706 and the second base station 708 may be co-located.

Using carrier aggregation (CA) can increase per user and system throughput in a network. In a hybrid 5G network example, CA may involve the aggregation of a carrier from the PCell and a mmW carrier from the SCell. Initially, the UE 702 may be connected with the first base station 706, and search for a potential SCell that uses a mmW carrier. To facilitate CA, the second base station 708 may periodically transmit reference signals via different beams 712 for initial beam selection. In one aspect of the disclosure, the reference signal (RS) 714 may be a Channel State Information Reference Signal (CSI-RS) or synchronization signal block (SSB). If the UE 702 is located near the edge of the SCell 710 and/or unable to receive the RS 714 due to various reasons (e.g., interference, insufficient signal strength, etc.), the UE 702 cannot detect the RS and select the best beam transmitted by the SCell 710 based on the RS.

Aspects of the present disclosure provide various procedures, apparatuses, and methods for extending the coverage of a reference signal (RS) transmitted by an SCell. In some examples, a PCell may trigger an SCell to boost the RS range by using higher gain beams and/or RS repetitions. The RS range refers to the range or distance that an RS may reach and be detected by a receiver (e.g., UE).

Figure 8:
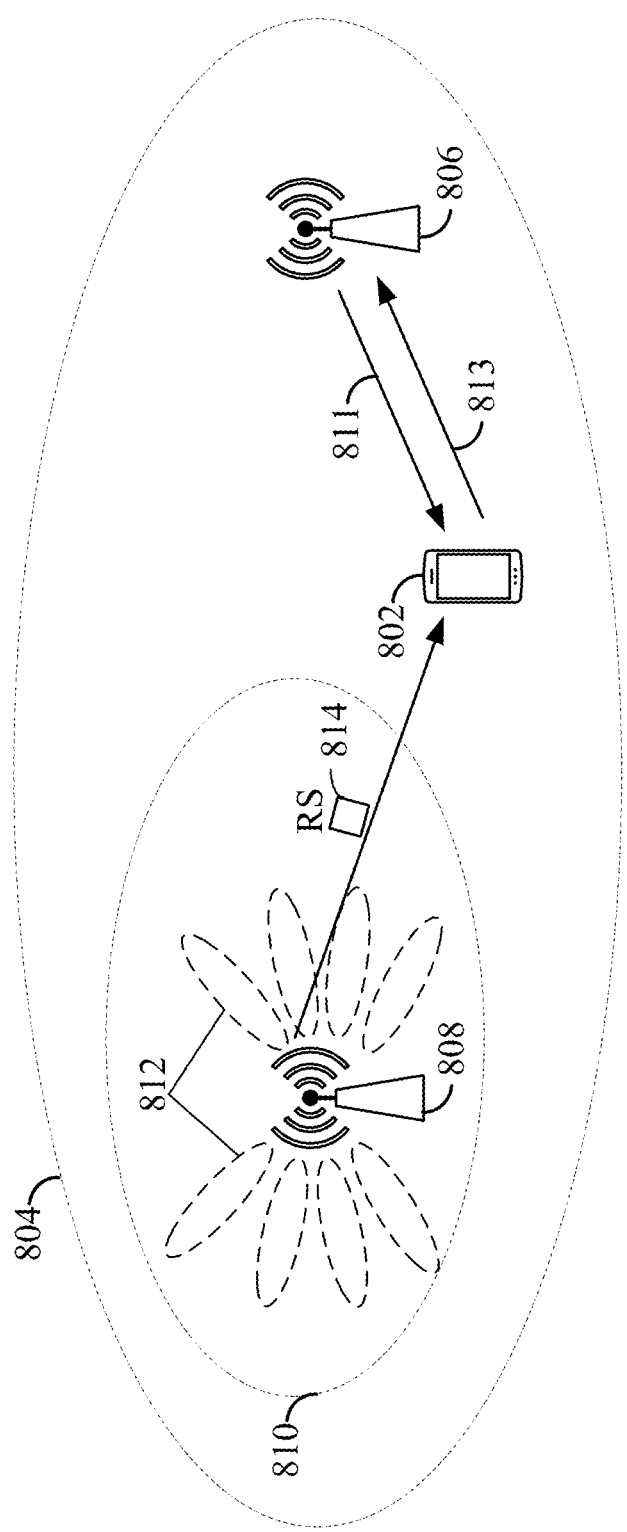
FIG. 8 is a diagram illustrating an example of reference signal coverage extension using higher gain beams according to some aspects of the present disclosure.

FIG. 8 is a diagram illustrating an example of RS coverage extension procedure using higher gain beams in accordance with some aspects of the present disclosure. A UE 802 may be located in a primary (PCell) 804 controlled by a first base station 806. The first base station 806 may be associated with a second base station 808 that controls a secondary cell (SCell) 810. The UE 802 may be any of the UEs illustrated in FIGS. 1, 2, and/or 3. The first base station 806 and second base station 808 may be any of the base stations and scheduling entities illustrated in FIGS. 1, 2, and/or 3. In some examples, the first base station 806 and the second base station 808 may be co-located. The second base station 808 may transmit an RS in a plurality of beams using beamforming like that shown in FIG. 7.

The PCell 804 may configure the UE 802 to detect a beam from the SCell 810 for potential CA. For example, the PCell 804 may transmit a measurement request 811 to the UE 802 to measure a reference signal (RS) from the SCell 810. In beamforming applications, the PCell 804 may configure the UE to measure one or more beams including the reference signal. The UE 802 performs the measurements and reports that to the base station 806 of the PCell. Based on the UE's measurement report 813, the PCell (e.g., base station 806) can determine whether or not the UE can receive the reference signal from the SCell 810 with sufficient quality to support CA. If needed, the PCell (i.e., first base station 806) may trigger the SCell (e.g., second base station 808) via a wired or wireless backhaul connection to boost or extend the range of its RS by using higher gain beams. For example, the SCell may transmit its RS 814 using beams 812 that are narrower than the beams 712 (see FIG. 7) to provide a higher peak gain. The SCell may transmit its RS 814 using the beams 812 in turn to sweep the beams in multiple directions. In some examples, the SCell may transmit the RS 814 on multiple beams 812 simultaneously. Using higher gain beams, the SCell can extend the RS range such that it is more likely that the UE 802 can detect a beam from the SCell 810.

Figure 9:
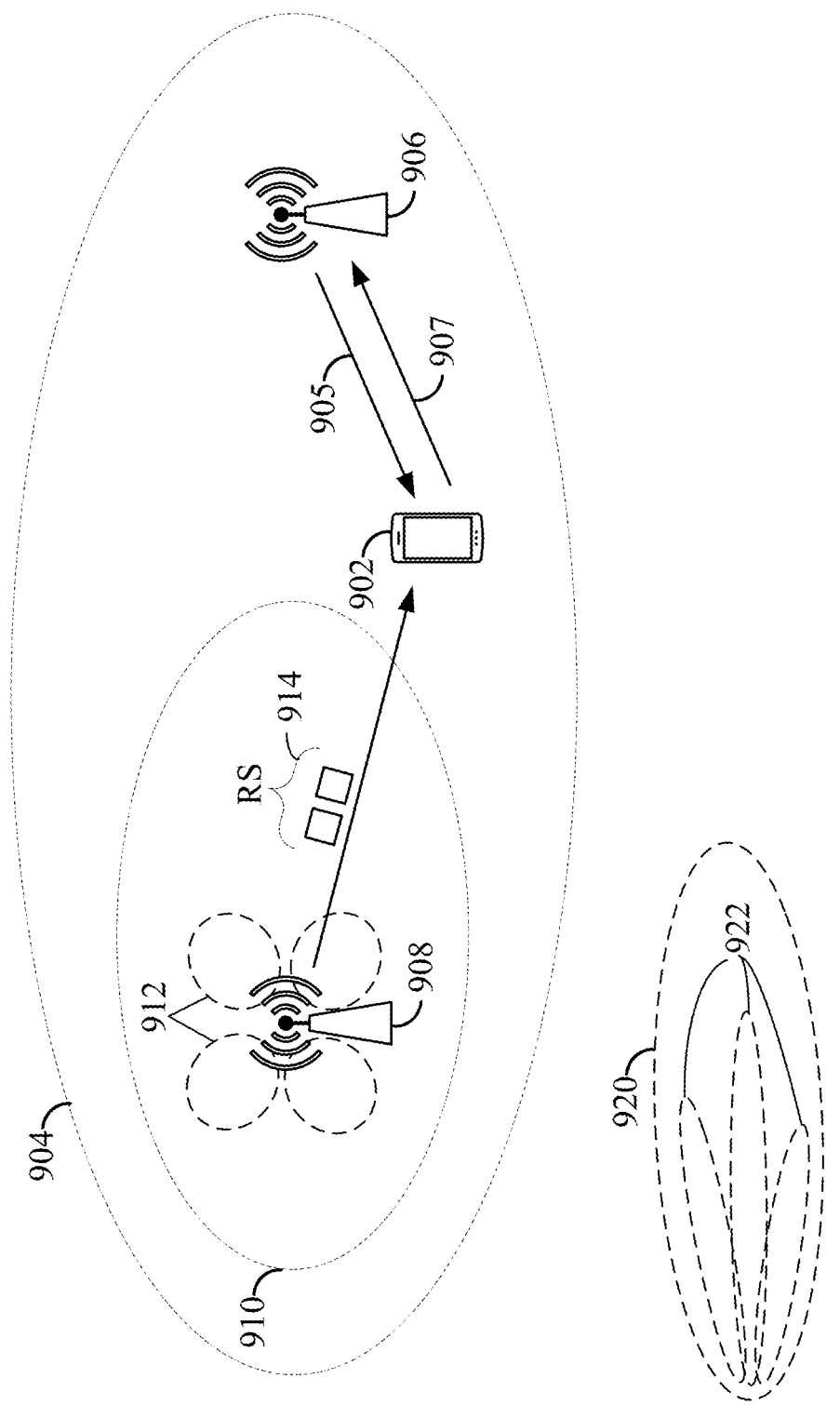
FIG. 9 is a diagram illustrating an example of reference signal coverage extension using repetition according to some aspects of the present disclosure.

FIG. 9 is a diagram illustrating an example of RS coverage extension procedure using repetition in accordance with some aspects of the present disclosure. A UE 902 may be located in a primary cell (PCell) 904 controlled by a first base station 906. The first base station 906 may be associated with a second base station 908 that controls a secondary cell (SCell) 910. The UE 902 may be any of the UEs illustrated in FIGS. 1, 2, and/or 3. The first base station 906 and second base station 908 may be any of the base stations and scheduling entities illustrated in FIGS. 1, 2, and/or 3. The second base station 908 may transmit an RS in one or more beams using beamforming. In some examples, the first base station 906 and second base station 908 may be co-located.

The PCell 904 may configure the UE 902 to detect a beam from the SCell 910 for potential CA. For example, the PCell 904 may transmit a measurement request 905 to the UE 902 to measure a reference signal from the SCell 910. In beamforming applications, the PCell 904 may configure the UE to measure one or more beams carrying the reference signal. The UE 902 performs the measurements and reports that to the base station 906 of the PCell. Based on the UE's measurement report 907, the PCell (e.g., base station 906) can determine whether or not the UE can receive the reference signal from the SCell 910 with sufficient quality to support CA. If needed, the PCell (e.g., first base station 906) may trigger the SCell (e.g., second base station 908) to boost or extend the range of its RS by using repetition. For example, the PCell may instruct the SCell to transmit its RS in one or more beams with a predetermined repetition (e.g., 2 or more RS repetition in each beam). To that end, the PCell informs the UE 902 the repetition pattern, repetition number, and time-frequency resources assigned to the repeated RS so that the UE can receive and combine the repeated RS transmissions to increase the likelihood that the UE can detect the best beam carrying the RS. For example, the first base station 906 may provide the repetition information to the UE using an RRC message and/or downlink control information (DCI).

In addition to repeating the RS using a same beam, the RS repetition can also use different beams that are quasi-collocated with a reference beam 920. In an example illustrated in FIG. 9, each quasi-collocated beam 922 for the repetition has a narrower beam width than the corresponding reference beam 920, and different beams for the repetition are pointed to different directions within the beam width of the reference beam. Therefore, the RS is repeated across different narrower beams 922 within the angular range of the wider reference beam 920. Due to the higher gain of each narrow beam, the UE may detect the RS from one of the narrow beams before the end of RS repetition.

Figure 10:
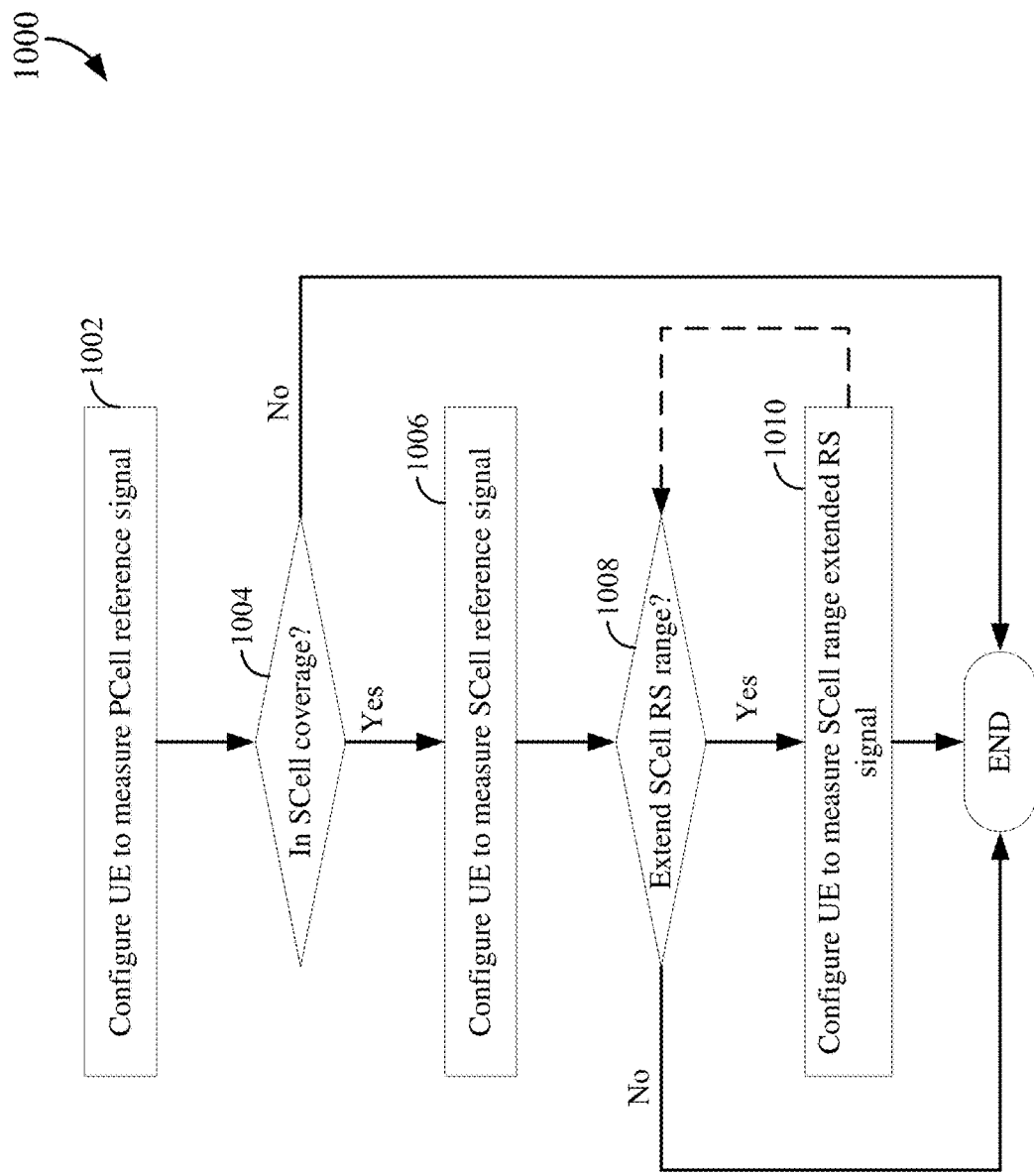
FIGS. 10 and 11 are diagrams illustrating a procedure for extending a reference signal coverage of a secondary cell according to some aspects of the disclosure.

FIG. 10 is a diagram illustrating a procedure 1000 for extending a reference signal coverage of a cell in accordance with some aspects of the disclosure. In some examples, the process 1000 may be used to extend the RS coverage of a secondary cell. In some examples, the process 1000 may be carried out by any suitable apparatus or means for carrying out the functions or algorithm described below.

Figure 11:
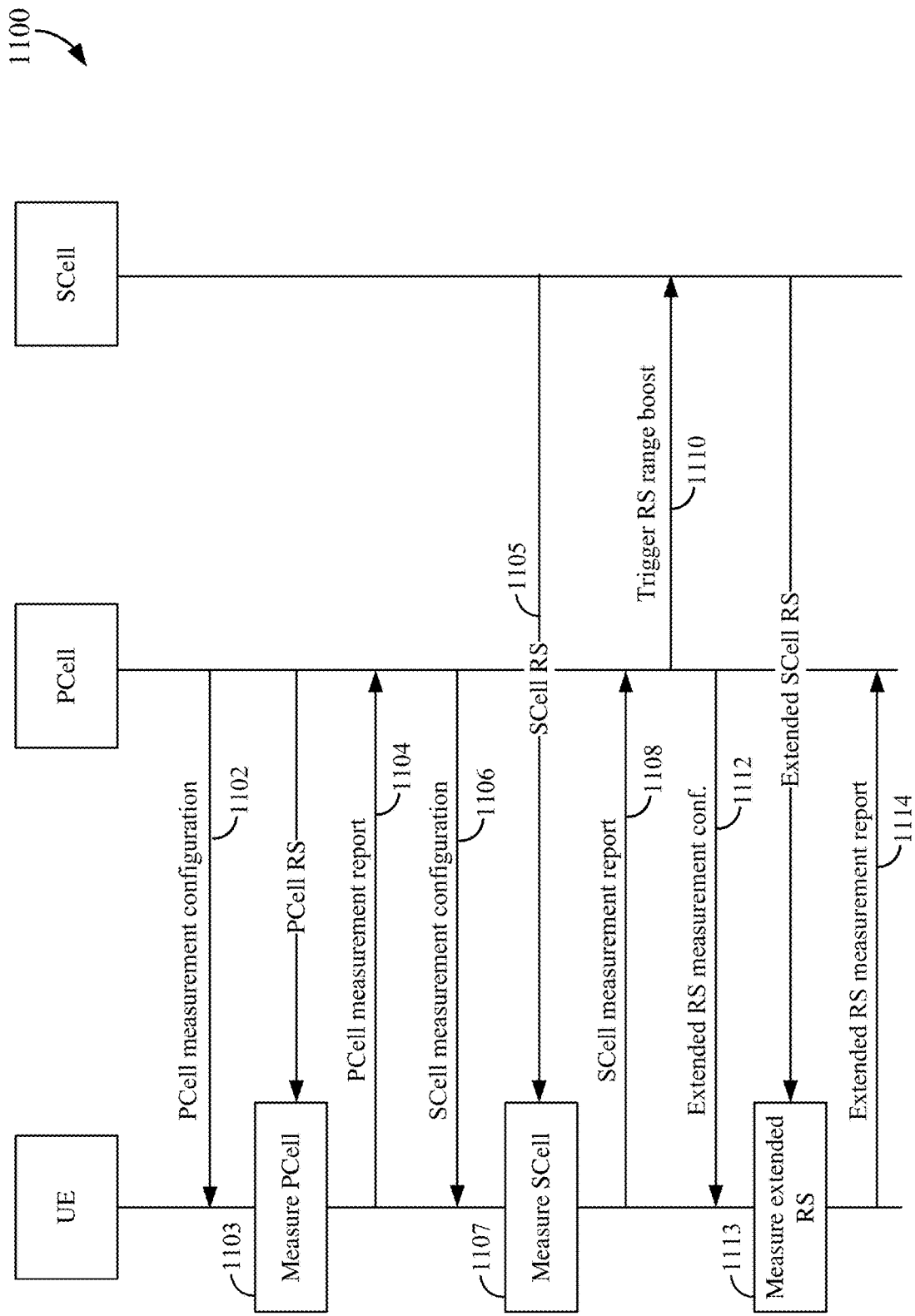

At block 1002, a primary cell (PCell) may configure a UE to measure a reference signal of the PCell. Referring to FIG. 11, for example, a PCell transmits a PCell measurement configuration message 1102 to configure the UE to measure the channel quality of the PCell. In some examples, the PCell may communicate with the UE using a carrier frequency below 6 GHz (sub-6 GHz), and the SCell may communicate with the UE using a carrier frequency above 6 GHz (e.g., mmW carrier). Based on the PCell measurement configuration message 1102, the UE may measure, for example at 1103, PCell's reference signal (e.g., CSI-RS or SSB). After measuring the PCell, the UE may transmit a PCell measurement report 1104 back to the PCell. In some examples, the PCell measurement report 1104 may include a reference signal received power (RSRP) or reference signal received quality (RSRQ) of the reference signal (e.g., CSI-RS or SSB), and/or other channel state information (CSI).

In some aspects of the disclosure, the UE may transmit the PCell measurement report 1104 using a layer 1 report or layer 3 report. Layer 1 and layer 3 refer to the protocol stack layers used in communication. Layer 1 may include the physical layer, and layer 3 may include the RRC layer. In one example, a layer 1 report may be a periodic, semi-periodic, or aperiodic physical layer report. In one example, a layer 3 report may be an event triggered report (e.g., an event A1) that is triggered when the serving cell's channel quality becomes better than a certain threshold.

Referring back to FIG. 10, at decision block 1004, the PCell may use the reported PCell measurements (e.g., CSI-RSRP or SS-RSRP) to determine whether or not the UE is potentially in the SCell's coverage area. If the base stations of the PCell and SCell are co-located or in close proximity to each other, the PCell may use the reported PCell measurements to determine the potential that the UE is in the SCell's coverage area. In one example, if the reported CSI-RSRP or SS-RSRP is above a predetermined threshold value, the PCell may determine that the UE is in the SCell's coverage area. When the UE is in the SCell's coverage area, the UE can communicate with the SCell's scheduling entity or base station.

If the PCell determined that the UE is potentially in the SCell's coverage area, at block 1006, the PCell may configure the UE to measure the SCell's reference signals to confirm that the UE is in the SCell's coverage. Referring to FIG. 11, for example, the PCell may transmit an SCell measurement configuration message 1106 to configure the UE to measure the channel quality of the SCell. Based on the SCell measurement configuration message 1106, at block 1107, the UE may detect and measure, for example, the SCell's reference signal 1105 (e.g., CSI-RS or SSB). Then, the UE transmits an SCell measurement report 1108 back to the PCell such that the PCell can determine whether the SCell can be used for CA by the UE. For example, the SCell measurement report 1108 may include the RSRP and/or RSRQ of the SCell's reference signal (e.g., CSI-RS or SSB), and/or other CSI. The UE may transmit the SCell measurement report 1108 using a layer 1 (L1) or layer 3 (L3) report.

Referring back to FIG. 10, at decision block 1008, the PCell decides whether or not to extend the SCell's RS range. For example, if the reported SCell reference signal quality (e.g., CSI-RSRP or SS-RSRP) is below a threshold value, or the UE transmitted no SCell measurement report at all for event triggered measurements, the PCell may transmit an RS range boost message 1110 (see FIG. 11) to trigger the SCell to extend or boost its RS range from a nominal range to an extended range. In some aspects of the disclosure, the PCell may configure the SCell, via a wireless or wired backhaul connection, to extend its RS range using a higher gain beam as described above in relation to FIG. 8 and/or using RS repetition as described above in relation to FIG. 9.

If the PCell extended SCell RS range, at block 1010, the PCell configures the UE to measure the SCell's range extended RS. Referring to FIG. 11, for example, the PCell transmits an extended RS measurement configuration 1112 to configure the UE to measure (block 1113) the range extended RS from the SCell. The extended RS measurement configuration 1112 may include RS repetition pattern and/or RS measurement metric. Then, the UE may report the measurements to the PCell using an L1 or L3 report (e.g., Extended RS measurement report 1114). In one example, if the quality of the extended RS (e.g., CSI-RSRP or SS-RSRP) measured by the UE is still below a threshold value, or the UE reports no SCell measurement report for event triggered measurements, the PCell may instruct the SCell to further boost the RS range and request the UE to measure the boosted RS again. In another example, the PCell may request the UE to measure the SCell's RS again when the UE reports higher PCell signal quality (e.g., higher CSI-RSRP or SS-RSRP).

Figure 12:
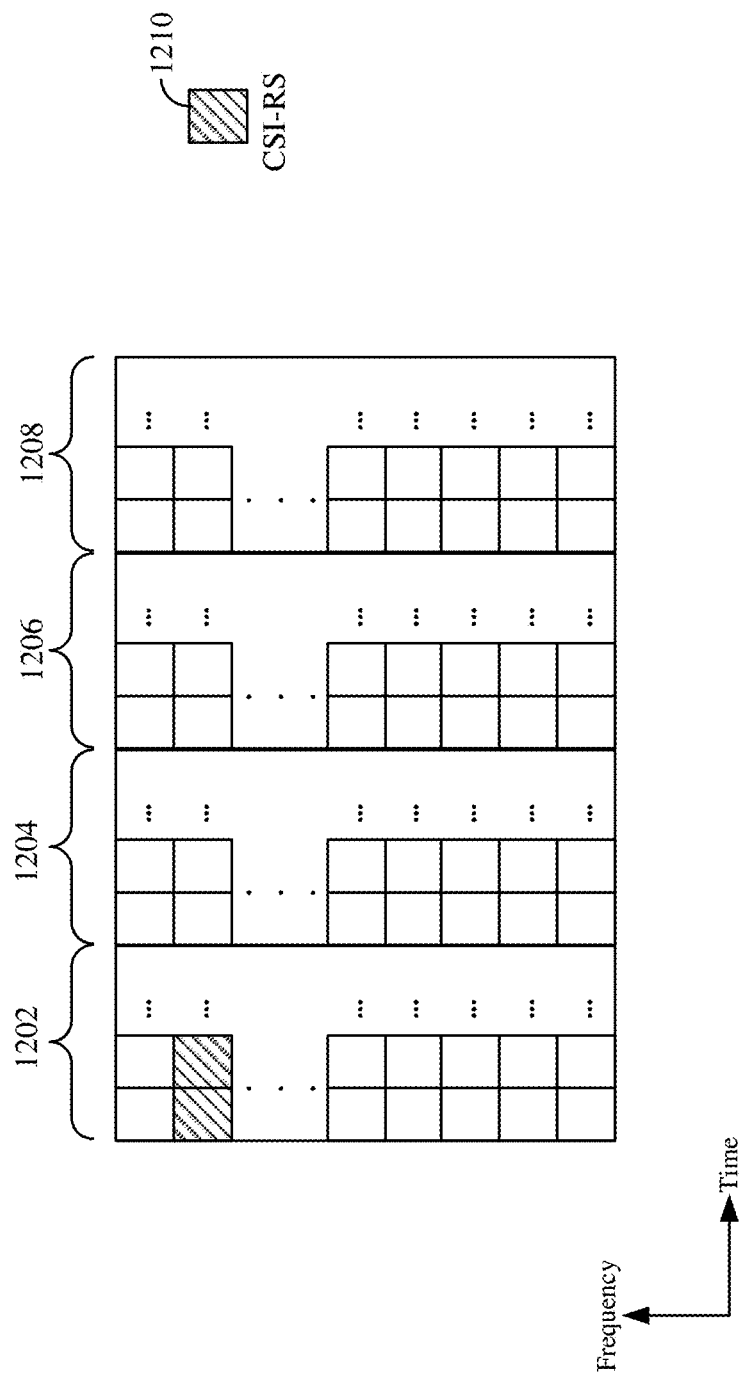
FIG. 12 is a diagram illustrating an exemplary reference signal repetition pattern according to some aspects of the disclosure.

FIG. 12 is a diagram illustrating an exemplary reference signal (RS) repetition pattern in accordance with some aspects of the disclosure. In some examples, this RS repetition pattern may be used to extend a reference signal of the SCell as described in relation to FIGS. 8-11 above. In one particular example, the reference signal may be a CSI-RS or SSB. Four exemplary centralized CSI-RS resource sets 1202, 1204, 1206, and 1208 are shown in FIG. 12. Each centralized CSI-RS resource set includes certain time-frequency resources similar to the resource elements (REs) 406 described above in relation to FIG. 4.

A CSI-RS 1210 may be repeated one or more times in each CSI-RS resource set. Two exemplary REs allocated to CSI-RS 1210 are illustrated in FIG. 12. In other examples, two or more REs may be allocated to CSI-RS repetition in each CSI-RS resource set. In one aspect of the disclosure, an SCell may use a fixed transmit (Tx) beam for all CSI-RS resources within a CSI-RS resource set. In some examples, all resources in the resource set may have the same time-frequency allocation size and may be configured with the same periodicity. In one aspect of the disclosure, all four CSI-RS resource sets 1202, 1204, 1206, and 1208 correspond to the same TX beam. For example, an SCell may transmit the CSI-RS in all four CSI-RS resource sets using the same TX beam.

In one aspect of the disclosure, a PCell may define a measurement metric for the RS per CSI-RS resource set instead of per resource (e.g., RE). The PCell may inform the UE the CSI-RS repetition pattern and measurement metric, for example, in an extended RS measurement configuration 1112 (see FIG. 11). With the knowledge of the RS repetition and measurement metric, the UE can measure and report the CSI-RS back to the PCell. For example, the RS repetition pattern may indicate the specific REs allocated to repeat CSI-RS per CSI-RS resource set.

In one example, the measurement metric of a repeated CSI-RS may include the reference signal received power (RSRP) of a CSI-RS resource set that is determined as the RSRP over all resources in the same resource set. In another example, the measurement metric of a repeated CSI-RS may include the signal-to-interference-plus-noise ratio (SINR) of a CSI-RS resource set that is determined as the linearly summed RSRP over all resources in the resource set divided by the linearly averaged noise plus interference power over all resources in the same CSI-RS resource set.

In another example, the measurement metric of a repeated CSI-RS may include the relative received signal strength indication (RSSI) of a CSI-RS resource set that is determined as the linearly averaged RSSI over all resources in the same CSI-RS resource set.

In another example, the measurement metric of a repeated CSI-RS may include the reference signal received quality (RSRQ) of a CSI-RS resource set that is determined as:

$$N \times \frac{RSRP \text{ of the resource set}}{RSSI \text{ of the resource set}},$$

where N is the number of RBs in the RSSI measurement bandwidth.

The UE may report the CSI-RS measurements using a layer (L1) or layer 3 (L3) report (e.g., an extended RS measurement report 1114 of FIG. 11). If the UE transmits an L3 report, the UE may apply L3 filtering to each metric per CSI-RS resource set. For example, L3 filtering may apply a rolling average to the measurements. L3 filtering averages raw measurements in a certain time window, to reflect long-term cell quality by smoothing short-term variations, e.g., due to fading. Averaged CSI-RS measurements may be more suitable for cell selection purpose.

In another example, the measurement metric of a repeated CSI-RS may include a rank indicator, precoding matrix indicator (PMI), and/or channel quality indicator (CQI) per layer (e.g., MIMO layer) that can be determined based on a channel matrix linearly averaged over all resources in a CSI-RS resource set.

In another example, the measurement metric of a repeated CSI-RS may include a rank indicator, PMI, and/or CQI per layer that can be determined based on a channel matrix per resource, and then further linearly averaged over all resources in a CSI-RS resource set.

In the above measurement metric examples, a "linearly averaged" operation may be replaced with a linearly summed operation, or choosing a maximum or minimum of the measured values.

Figure 13:
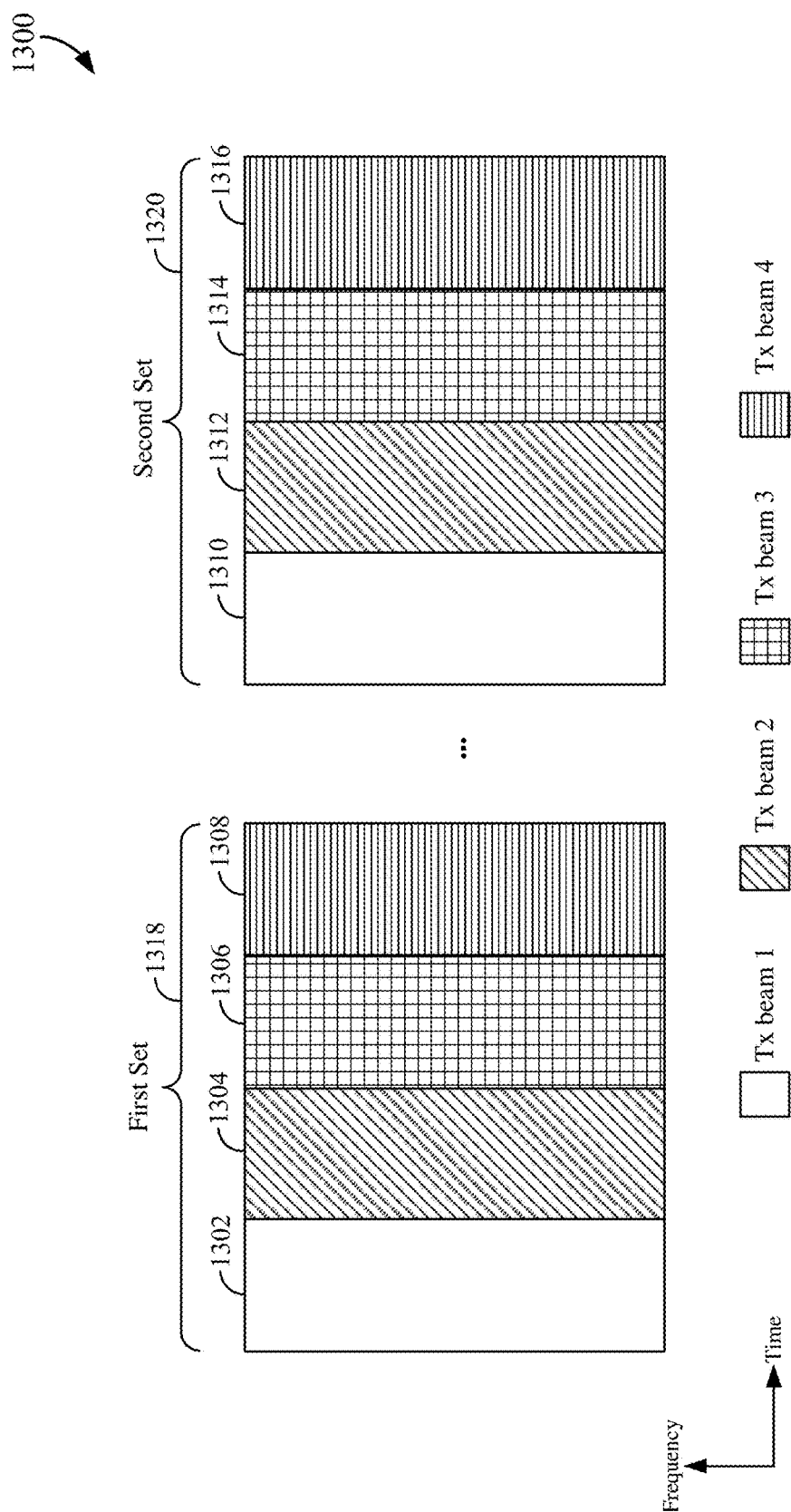
FIG. 13 is a diagram illustrating an exemplary reference signal repetition pattern according to some aspects of the disclosure.

FIG. 13 is a diagram illustrating another exemplary reference signal repetition pattern 1300 in accordance with some aspects of the disclosure. In some examples, an SCell may use this repetition pattern 1300 to extend the range of a reference signal as described above in relation to FIGS. 8-11. In one particular example, the repeated reference signal may be a CSI-RS or SSB. Eight exemplary CSI-RS resource sets 1302, 1304, 1306, 1308, 1310, 1312, 1314, and 1316 are shown in FIG. 13. Each resource set includes certain time-frequency resources similar to the resource elements (REs) 406 shown in FIG. 4.

In one aspect of the disclosure, an SCell may repeat a reference signal (e.g., CSI-RS) using a fixed Tx beam that is distributed across multiple resource sets. That is, CSI-RS repetition may be performed per fixed Tx beam that corresponds to a subset of resources per CSI-RS resource set, and is distributed across multiple resource sets. For example, referring to FIG. 13, Tx beam 1 is repeated over a subset 1302 in a first set of CSI-RS resource set and a subset 1310 of a second set of CSI-RS resource set. The subsets 1302 and 1310 are not adjacent to each other. Similarly, Tx beam 2 is repeated over a subset 1304 in the first set of CSI-RS resource set and a subset 1312 of the second set of CSI-RS resource set. Tx beam 3 and Tx beam 4 may be repeated in a similar fashion. In some examples, all resources (e.g., REs) per beam and across beams may have the same time-frequency allocation size.

In one example, a UE located near an SCell may not need CSI-RS repetition, and hence may only wake up in one resource set periodically to get a full beam sweep measurement. For example, the UE can wake up only in the first set 1318 or second set 1320 of CSI-RS resource set.

In one aspect of the disclosure, a PCell may define a measurement metric per Tx beam index, instead of per resource (e.g., RE). The PCell may inform the UE the CSI-RS repetition pattern and measurement metric, for example, in an extended RS measurement configuration 1112 (see FIG. 11).

In one example, the measurement metric of a repeated CSI-RS may include the RSRP of resources corresponding to a Tx beam index (e.g., Tx beam 1, Tx beam 2, Tx beam 3, and Tx beam 4) that is determined as the linearly summed RSRP over all resources of the same beam.

In another example, the measurement metric of a repeated CSI-RS may include the SINR of resources corresponding to a Tx beam index that is determined as the linearly summed RSRP over all resources of a Tx beam index divided by the linearly averaged noise plus interference power over all resources for the same beam index. For example, the CSI-RS resources of Tx beam 1 (see FIG. 13) include resource sets 1302 and 1310, the CSI-RS resources of Tx beam 2 include resource sets 1304 and 1312, the CSI-RS resources of Tx beam 3 include resource sets 1306 and 1314, and the CSI-RS resources of Tx beam 4 include resource sets 1308 and 1316.

In another example, the measurement metric of a repeated CSI-RS may include the RSSI of resources corresponding to a Tx beam index that is determined as the linearly averaged RSSI over all resources for the same Tx beam index.

In another example, the measurement metric of a repeated CSI-RS may include the RSRQ of resources corresponding to a Tx beam index that is determined as:

$$N \times \frac{RSRP \text{ of a } Tx \text{ Beam Index}}{RSSI \text{ of a } Tx \text{ Beam Index}},$$

where N is the number of RBs in the RSSI measurement bandwidth.

The UE may report the above described CSI-RS measurements using an L1 or L3 report (e.g., an extended RS measurement report 1114 of FIG. 11). If the UE transmits the measurements in an L3 report, the UE may apply L3 filtering to each metric per beam index. For example, L3 filtering may apply a rolling average to the measurements.

In another example, the measurement metric of a repeated CSI-RS may include a rank indicator, PMI, and CQI per layer (e.g., MIMO layer) that can be determined based on a channel matrix linearly averaged over all resources for a same Tx beam index. In another example, the measurement metric of a repeated CSI-RS may include a rank indicator, PMI, and CQI per layer that can be determined based on a channel matrix per resource, and then further linearly averaged over all resources for the same Tx beam index. In the above-described measurement metric examples, a "linearly averaged" operation may be replaced with a linearly summed operation, or choosing a maximum or minimum of the measured values.

Figure 14:
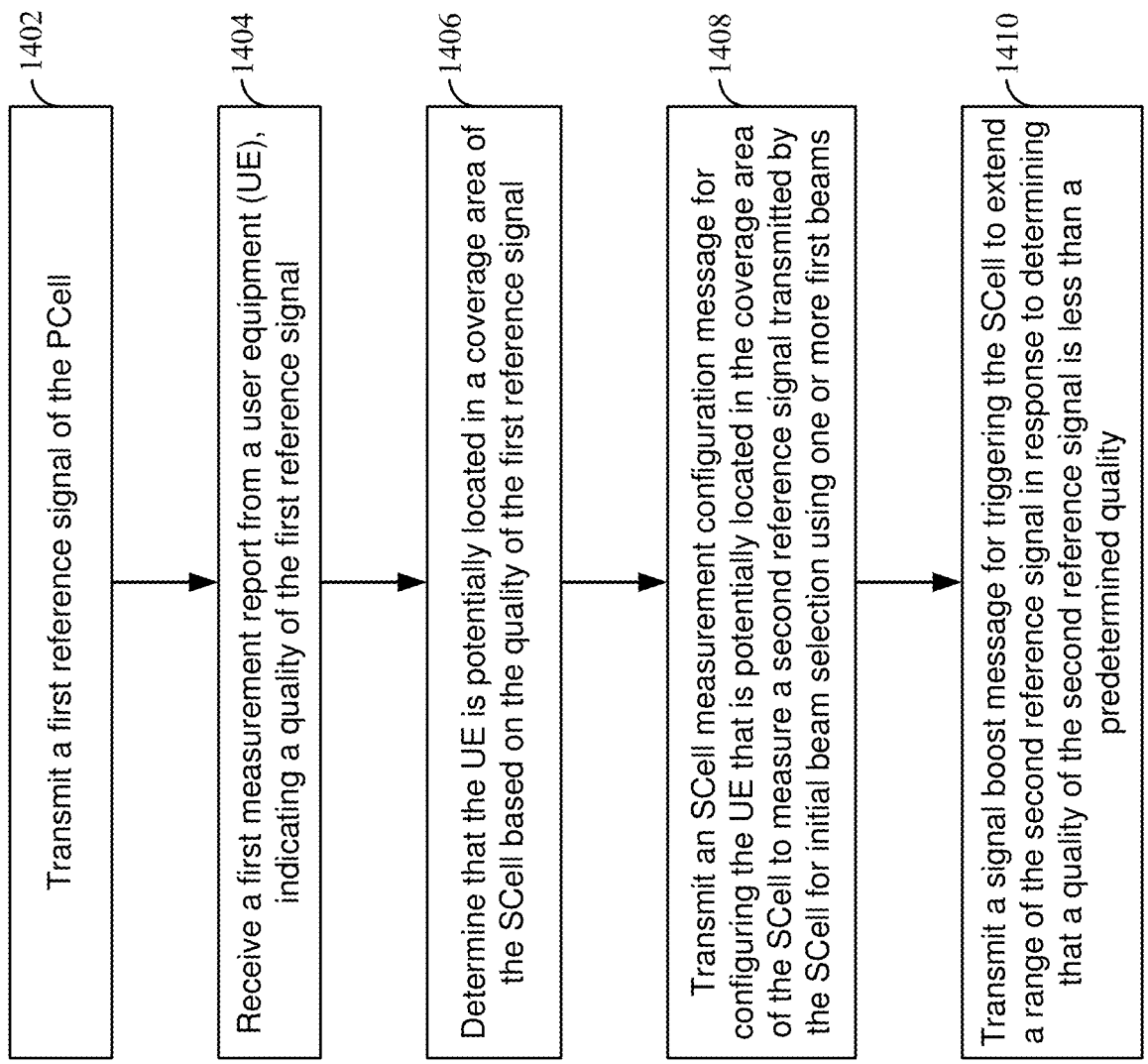
FIG. 14 is a flow chart illustrating an exemplary process operable by a primary cell for carrier aggregation according to some aspects of the present disclosure.

FIG. 14 is a flow chart illustrating an exemplary process 1400 operable by a primary cell for carrier aggregation in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduling entity 500 illustrated in FIG. 5. In some examples, the process 1400 may be carried out by any suitable apparatus or means for carrying out the functions or algorithm described below.

In one particular example, the process 1400 may be performed by a base station or scheduling entity of a PCell like a base station 806 of FIG. 8 or a base station 906 of FIG. 9. At block 1402, the base station of the PCell transmits a first reference signal of the PCell. For example, the base station may use a UE communication circuit 540 (see FIG. 5) to transmit the first reference signal via a transceiver 510. In some examples, the base station of the PCell may transmit a CSI-RS or SSB as the reference signal using a sub-6 GHz carrier. In other aspects of the disclosure, the first reference signal may be a reference signal that allows a UE to estimate a wireless channel and report channel quality information back to a base station.

At block 1404, the base station receives a first measurement report from a UE, indicating a quality of the first reference signal. For example, the base station of the PCell may use the UE communication circuit 540 and transceiver 510 to receive the first measurement report 1104. The first measurement report may include a reference signal received power (RSRP) and/or reference signal received quality (RSRQ) of the first reference signal (e.g., CSI-RS or SSB), and/or other channel state information (CSI).

At block 1406, the base station of the PCell determines that a UE is potentially located in a coverage area of an SCell based on the quality of a first reference signal of the PCell. The base station may determine or estimate the location of the UE based on the first measurement report. For example, the base station of the PCell may use the RS measurement circuit 546 to process the first measurement report (e.g., measurement report 1104 described in relation to FIGS. 10 and 11) to determine whether or not the UE is potentially located in a coverage area of the SCell. The base station of the PCell has knowledge of the SCell coverage. Therefore, the base station of the PCell can also determine whether the UE is potentially located in the coverage area of the SCell based on the first measurement report. In some examples, the base stations of the PCell and SCell are co-located.

At block 1408, the base station of the PCell transmits an SCell measurement configuration message for configuring the UE that is potentially located in the coverage area of the SCell, to measure a second reference signal transmitted by the SCell for initial beam selection using one or more first beams. The SCell measurement configuration message may indicate the configuration or information (e.g., allocated time-frequency resources, sequences, port, layer, etc.) of a reference signal transmitted by the SCell. For example, the base station of the SCell may transmit a reference signal (e.g., CSI-RS or SSB) on one or more mmW beams or other high frequency beams (e.g., above 6 GHz beams) The base station of the PCell may use the UE communication circuit 540 and transceiver 510 to transmit an SCell measurement configuration 1106 (see FIG. 11) to configure the UE to measure the SCell's reference signal.

At block 1410, the base station of the PCell transmits a signal boost message for triggering the SCell to extend a range of the second reference signal from a first range to a second range, in response to determining that a quality of the second reference signal is less than a predetermined quality. In one example, the base station of the PCell may request or trigger the SCell to transmit the reference signal using a higher gain beam as described above in relation to FIG. 8. In another example, the base station may request or trigger the SCell to transmit the reference signal using RS repetition as described above in relation to FIG. 9. The base station of the PCell may use the SCell configuration circuit 544 and transceiver 510 to transmit a signal boost message (e.g., RS range boost message 1110 in FIG. 11) to the SCell through a wireless or wired backhaul connection. To that end, the base station of the PCell may use the UE communication circuit 540 to inform (e.g., transmitting an extended RS measurement configuration message 1112) the UE a repetition pattern of the range-extended reference signal for at least one fixed beam and a measurement metric of the range-extended reference signal. The measurement metric may be one or more of the RSSI, SINR, RSRQ, rank indicator, PMI, and/or CQI, as described above in relation to FIGS. 12 and 13.

Figure 15:
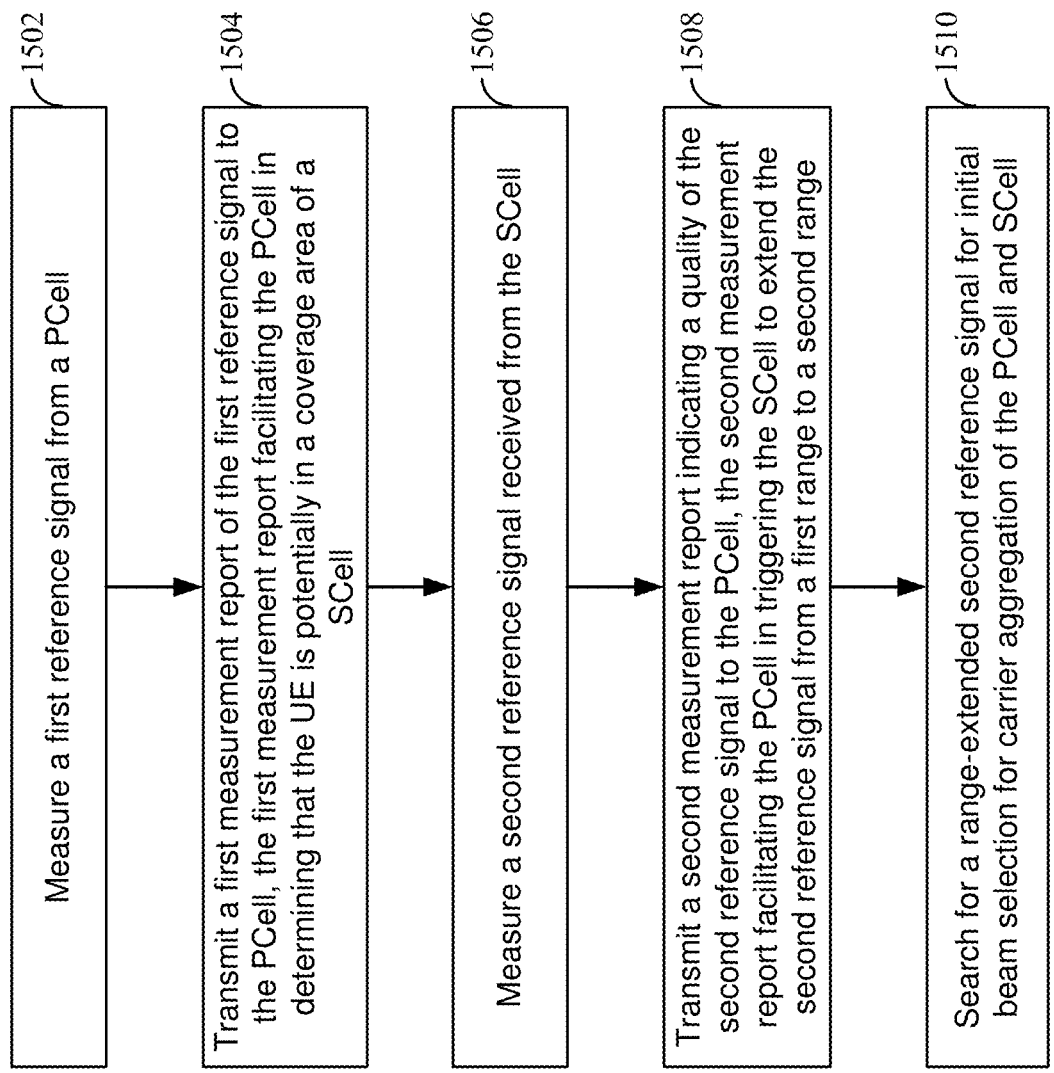
FIG. 15 is a flow chart illustrating an exemplary process operable by a user equipment for carrier aggregation in accordance with some aspects of the present disclosure.

FIG. 15 is a flow chart illustrating an exemplary process 1500 for carrier aggregation (CA) in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduled entity 600 illustrated in FIG. 6. In some examples, the process 1500 may be carried out by any suitable apparatus or means for carrying out the functions or algorithm described below.

In one particular example, the process 1500 may be performed by the UE 802 of FIG. 8 or UE 902 of FIG. 9 to facilitate CA across a PCell and an SCell. At block 1502, the UE measures a first reference signal from the PCell. For example, the first reference signal may be a CSI-RS or SSB transmitted by the PCell 704 or 804 using a sub-6 GHz carrier. The UE may use the RS measurement circuit 642 and/or transceiver 610 to receive and measure the first reference signal. In other aspects of the disclosure, the first reference signal may be a reference signal that allows the UE to estimate a wireless channel and determine the corresponding channel quality information.

At block 1504, the UE transmits a first measurement report of the first reference signal to the PCell. The first measurement report facilitates the PCell in determining that the UE is potentially in a coverage area of the SCell. In some examples, the first measurement report may include one or more of the RSSI, SINR, RSRQ, rank indicator, PMI, and/or CQI of time-frequency resources used to transmit the first reference signal. The UE may use the communication circuit 640 and transceiver 610 to transmit the first measurement report as an L1 report or L3 report.

At block 1506, the UE measures a second reference signal received from the SCell. For example, the UE may use the RS measurement circuit 642 and transceiver 610 to measure the second reference signal. In other aspects of the disclosure, the second reference signal may be a reference signal that allows the UE to estimate a wireless channel and determine the corresponding channel quality information. In one example, the second reference signal may be CSI-RS or SSB (e.g., SCell RS 1105 of FIG. 11).

At block 1508, the UE may transmit a second measurement report indicating the quality of the second reference signal to the PCell. In some examples, the UE may use the communication circuit 640 and transceiver 610 to transmit the second measurement report (e.g., SCell measurement report 1108 in FIG. 11) in an L1 report or L3 report. The second measurement report may include a reference signal received power (RSRP) of the second reference signal, a reference signal received quality (RSRQ) of the second reference signal, and/or other signal quality indicators.

At block 1510, the UE may use a carrier aggregation circuit 644 to search for a range-extended second reference signal for initial beam selection for carrier aggregation of the PCell and SCell. In one example, the SCell may transmit the range-extended second reference signal using a higher gain beam as described above in relation to FIG. 8. In another example, the SCell may transmit the range-extended second reference signal using RS repetition as described above in relation to FIG. 9. To that end, the PCell may inform the UE on the repetition pattern of the range-extended reference signal and the measurement metric for the range-extended reference signal. For example, the base station of the PCell may transmit an extended RS measurement configuration 1112 (see FIG. 11) to inform the UE on the repetition pattern of the range-extended reference signal and the measurement metric for the range-extended reference signal.

In one configuration, the apparatus 500 and/or 600 for wireless communication includes means for performing the operations and procedures described above in relation to FIGS. 8-15. In one aspect, the aforementioned means may be the processor(s) 504 and/or 604 shown in FIGS. 5 and 6 configured to perform the functions recited by the aforementioned means. In another aspect, the aforementioned means may be a circuit or any apparatus configured to perform the functions recited by the aforementioned means.

Of course, in the above examples, the circuitry included in the processor 504 or 604 is merely provided as an example, and other means for carrying out the described functions may be included within various aspects of the present disclosure, including but not limited to the instructions stored in the computer-readable storage medium 506/606, or any other suitable apparatus or means described in any one of the FIGS. 1, 2, and/or 3, and utilizing, for example, the processes and/or algorithms described herein in relation to FIGS. 8-15.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein.

The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for wireless communication using carrier aggregation in a wireless communication network comprising a primary cell (PCell) and a secondary cell (SCell), the apparatus comprising:
a communication interface configured for wireless communication;
a memory; and
a processor operatively coupled to the communication interface and the memory,
wherein the processor and the memory are configured to:
transmit, via the communication interface, a first reference signal of the PCell;
receive, via the communication interface, a first measurement report from a user equipment (UE), indicating a quality of the first reference signal;
determine that the UE is potentially located in a coverage area of the SCell based on the quality of the first reference signal;
transmit, via the communication interface, an SCell measurement configuration message for configuring the UE that is potentially located in the coverage area of the SCell to measure a second reference signal transmitted by the SCell for initial beam selection using one or more first beams;
transmit, to the SCell, a signal boost message for triggering the SCell to extend a range of the second reference signal from a first range to a second range, in response to determining that a quality of the second reference signal is less than a predetermined quality,
wherein the signal boost message is configured to request the SCell to transmit a range-extended second reference signal using a second beam having a higher gain than the one or more first beams; and
receive, via the communication interface, a second measurement report from the UE, indicating the quality of the range-extended second reference signal of the SCell,
wherein the second measurement report corresponds to a resource set comprising a plurality of resources for repeating the second reference signal using the second beam.

2. The apparatus of claim 1, wherein the signal boost message is configured to request the SCell to repeat the range-extended second reference signal using the second beam or the one or more first beams.

3. The apparatus of claim 2, wherein the one or more first beams comprise a plurality of beams that are quasi-collocated with a reference beam.

4. The apparatus of claim 2, wherein the processor and the memory are further configured to:
transmit, via the communication interface, a reference signal configuration message configured to inform the UE of a repetition configuration for repeating the range-extended second reference signal and a measurement metric of the range-extended second reference signal.

5. The apparatus of claim 4, wherein the repetition configuration comprises at least one of:
a repetition number of the range-extended second reference signal;
a time location for each repetition of the range-extended second reference signal; or
a frequency location for each repetition of the range-extended second reference signal.

6. The apparatus of claim 2, wherein the second measurement report comprises at least one of:
a reference signal received power (RSRP) defined as linearly summed RSRP over the plurality of resources in the resource set;
a signal-to-interference-plus-noise ratio (SINR) defined as linearly summed RSRP over the plurality of resources in the resource set divided by linearly averaged noise plus interference power over the plurality of resources in the resource set;
a relative received signal strength indication (RSSI) defined as linearly averaged RSSI over the plurality of resources in the resource set;
a reference signal received quality (RSRQ) based on the RSRP, the RSSI, and a number of resource blocks in a RSSI measurement bandwidth;
a rank indicator (RI), a precoding matrix indicator (PMI), and a channel quality indicator (CQI) per layer determined based on a channel matrix linearly averaged over the plurality of resources of the resource set; or
a RI, a PMI, and a CQI per layer determined based on a channel matrix per resource of the resource set and further linearly averaged over the plurality of resources of the resource set.

7. The apparatus of claim 1, wherein the processor and the memory are further configured to determine that the UE is potentially located in the coverage area of the SCell when the first measurement report indicates that the quality of the first reference signal is above a predetermined threshold.

8. The apparatus of claim 1, wherein the second reference signal of the SCell comprises at least one of a channel state information reference signal (CSI-RS) or a synchronization signal block (SSB).

9. The apparatus of claim 1, wherein the processor and the memory are further configured to:
receive, via the communication interface, a second measurement report from the UE in a layer 1 or layer 3 report, indicating a quality of the range-extended second reference signal of the SCell.

10. The apparatus of claim 1, wherein the signal boost message is configured to request the SCell to repeat the range-extended second reference signal using the one or more first beams.

11. A user equipment (UE) for wireless communication using carrier aggregation in a wireless communication network comprising a primary cell (PCell) and a secondary cell (SCell), comprising:
a communication interface configured for wireless communication;
a memory; and
a processor operatively coupled to the communication interface and the memory,
wherein the processor and the memory are configured to:
measure a first reference signal received from the PCell via the communication interface;
transmit, via the communication interface, a first measurement report of the first reference signal to the PCell, the first measurement report facilitating the PCell in determining that the UE is potentially in a coverage area of the SCell;
measure a second reference signal received from the SCell via the communication interface;
transmit, via the communication interface, a second measurement report indicating a quality of the second reference signal to the PCell, the second measurement report facilitating the PCell in triggering the SCell to extend the second reference signal from a first range to a second range;
receive, via the communication interface, a configuration message from the PCell, configuring the UE to measure a range-extended second reference signal using one or more beams;
search for the range-extended second reference signal, for initial beam selection for carrier aggregation of the PCell and SCell; and
transmit, via the communication interface, a third measurement report of the range-extended second reference signal to the PCell in a layer 1 or layer 3 report, indicating a quality of the range-extended second reference signal.

12. The UE of claim 11, wherein the processor and the memory are further configured to:
receive, via the communication interface, a configuration message from the PCell, indicating a repetition pattern and a measurement metric of the range-extended second reference signal.

13. The UE of claim 12, wherein the processor and the memory are further configured to transmit, via the communication interface, the second measurement report in a layer 1 or layer 3 report, indicating the quality of the second reference signal.

14. The UE of claim 13, wherein the second measurement report comprises at least one of:
a reference signal received power (RSRP) of the second reference signal; or
a reference signal received quality (RSRQ) of the second reference signal.

15. The UE of claim 11, wherein the second reference signal or range-extended second reference signal of the SCell comprises at least one of a channel state information reference signal (CSI-RS) or synchronization signal block (SSB).

16. A method of carrier aggregation in a wireless communication network comprising a primary cell (PCell) and a secondary cell (SCell), comprising:
transmitting a first reference signal of the PCell;
receiving a first measurement report from a user equipment (UE), indicating a quality of the first reference signal;
determining that the UE is potentially located in a coverage area of the SCell based on the quality of the first reference signal;
transmitting an SCell measurement configuration message for configuring the UE that is potentially located in the coverage area of the SCell to measure a second reference signal transmitted by the SCell for initial beam selection using one or more first beams;
transmitting a signal boost message for triggering the SCell to extend a range of the second reference signal from a first range to a second range, in response to determining that a quality of the second reference signal is less than a predetermined quality,
wherein the signal boost message is configured to request the SCell to transmit a range-extended second reference signal using a second beam having a higher gain than the one or more first beams; and
receiving a second measurement report from the UE, indicating a quality of the range-extended second reference signal of the SCell,
wherein the second measurement report corresponds to a resource set comprising a plurality of resources for repeating the second reference signal using the second beam.

17. The method of claim 16, wherein the signal boost message is configured to:
request the SCell to repeat the range-extended second reference signal using the second beam or the one or more first beams.

18. The method of claim 17, wherein the one or more first beams comprise a plurality of beams that are quasi-collocated with a reference beam.

19. The method of claim 17, further comprising:
transmitting a reference signal configuration message configured to inform the UE of a repetition configuration for repeating the range-extended second reference signal and a measurement metric of the range-extended second reference signal.

20. The method of claim 19, wherein the repetition configuration comprises at least one of:
a repetition number of the range-extended second reference signal;
a time location for each repetition of the range-extended second reference signal; or
a frequency location for each repetition of the range-extended second reference signal.

21. The method of claim 17, wherein the second measurement report comprises at least one of:
a reference signal received power (RSRP) defined as linearly summed RSRP over the plurality of resources in the resource set;
a signal-to-interference-plus-noise ratio (SINR) defined as linearly summed RSRP over the plurality of resources in the resource set divided by linearly averaged noise plus interference power over the plurality of resources in the resource set;
a relative received signal strength indication (RSSI) defined as linearly averaged RSSI over the plurality of resources in the resource set;
a reference signal received quality (RSRQ) based on the RSRP, the RSSI, and a number of resource blocks in a RSSI measurement bandwidth;
a rank indicator (RI), a precoding matrix indicator (PMI), and a channel quality indicator (CQI) per layer determined based on a channel matrix linearly averaged over the plurality of resources of the resource set; or
a RI, a PMI, and a CQI per layer determined based on a channel matrix per resource of the resource set and further linearly averaged over the plurality of resources of the resource set.

22. The method of claim 16, wherein the determining that the UE being potentially located in the coverage area of the SCell, comprises:
determining that the UE is potentially located in the coverage area of the SCell when the first measurement report indicates that the quality of the first reference signal is above a predetermined threshold.

23. The method of claim 16, wherein the second reference signal of the SCell comprises at least one of a channel state information reference signal (CSI-RS) or a synchronization signal block (SSB).

24. The method of claim 16, further comprising:
receiving a second measurement report from the UE in a layer 1 or layer 3 report, indicating a quality of the range-extended second reference signal of the SCell.

25. The method of claim 16, wherein the signal boost message is configured to request the SCell to repeat the range-extended second reference signal using the one or more first beams.

26. A method of carrier aggregation operable at a user equipment (UE), comprising:
measuring a first reference signal from a primary cell (PCell);
transmitting a first measurement report of the first reference signal to the PCell, the first measurement report indicating that the UE is potentially in a coverage area of a secondary cell (SCell);
measuring a second reference signal received from the SCell;
transmitting a second measurement report indicating a quality of the second reference signal to the PCell, the second measurement report facilitating the PCell in triggering the SCell to extend the second reference signal from a first range to a second range;
receiving a configuration message from the PCell, configuring the UE to measure a range-extended second reference signal using one or more beams;
searching for the range-extended second reference signal, for initial beam selection for carrier aggregation of the PCell and SCell; and
transmitting a third measurement report of the range-extended second reference signal to the PCell in a layer 1 or layer 3 report, indicating a quality of the range-extended second reference signal.

27. The method of claim 26, wherein the second measurement report comprises at least one of:
a reference signal received power (RSRP) of the second reference signal; or
a reference signal received quality (RSRQ) of the second reference signal.

* * * * *